United States Patent [19]
Troy

[11] 3,768,786
[45] Oct. 30, 1973

[54] MULTI-MULL PHASE CONTROL SYSTEM
[75] Inventor: Elbert C. Troy, Highland Park, Ill.
[73] Assignee: National Engineering Company, Chicago, Ill.
[22] Filed: June 26, 1972
[21] Appl. No.: 266,430

[52] U.S. Cl.................. 259/179, 241/123, 259/104, 259/21
[51] Int. Cl............................................. B28c 5/10
[58] Field of Search.................. 259/179, 104, 6, 259/21, 41, 102, 103, 119; 241/123, 124, 126

[56] References Cited
UNITED STATES PATENTS
| | | | |
|---|---|---|---|
| 2,943,801 | 7/1960 | McIlvaine | 259/104 |
| 3,188,059 | 6/1965 | Strong | 259/179 |
| 3,285,582 | 11/1966 | Hubner | 259/104 |
| 3,334,822 | 8/1967 | McIlvaine | 241/124 |

*Primary Examiner*—Robert W. Jenkins
*Attorney*—Richard D. Mason et al.

[57] ABSTRACT

A multiple stage mixer including a pair of mixing chambers in communication with each other for the transfer of material therebetween and a rotary mixing element in each chamber movable on a path overlapping into the adjacent chamber in selected normal phase relation with respect to the mixing element therein. A source of motive power for rotatively driving said mixing elements and control means for rendering said motive power source ineffective when said mixing elements are out of said normal phase relation with each other is provided in order to prevent damage to the mixer in the event the phase relation between the mixing elements becomes abnormal.

10 Claims, 5 Drawing Figures

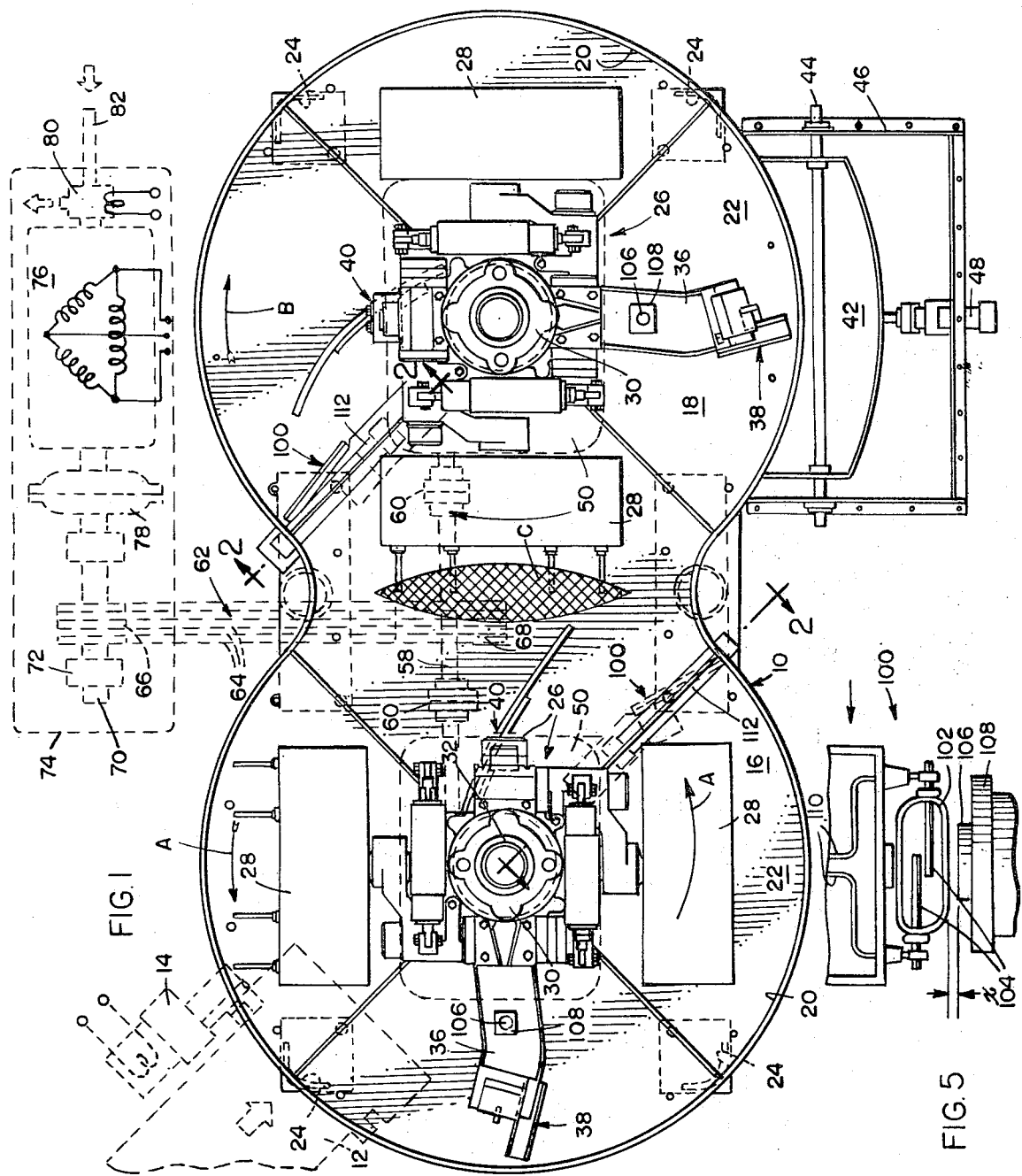

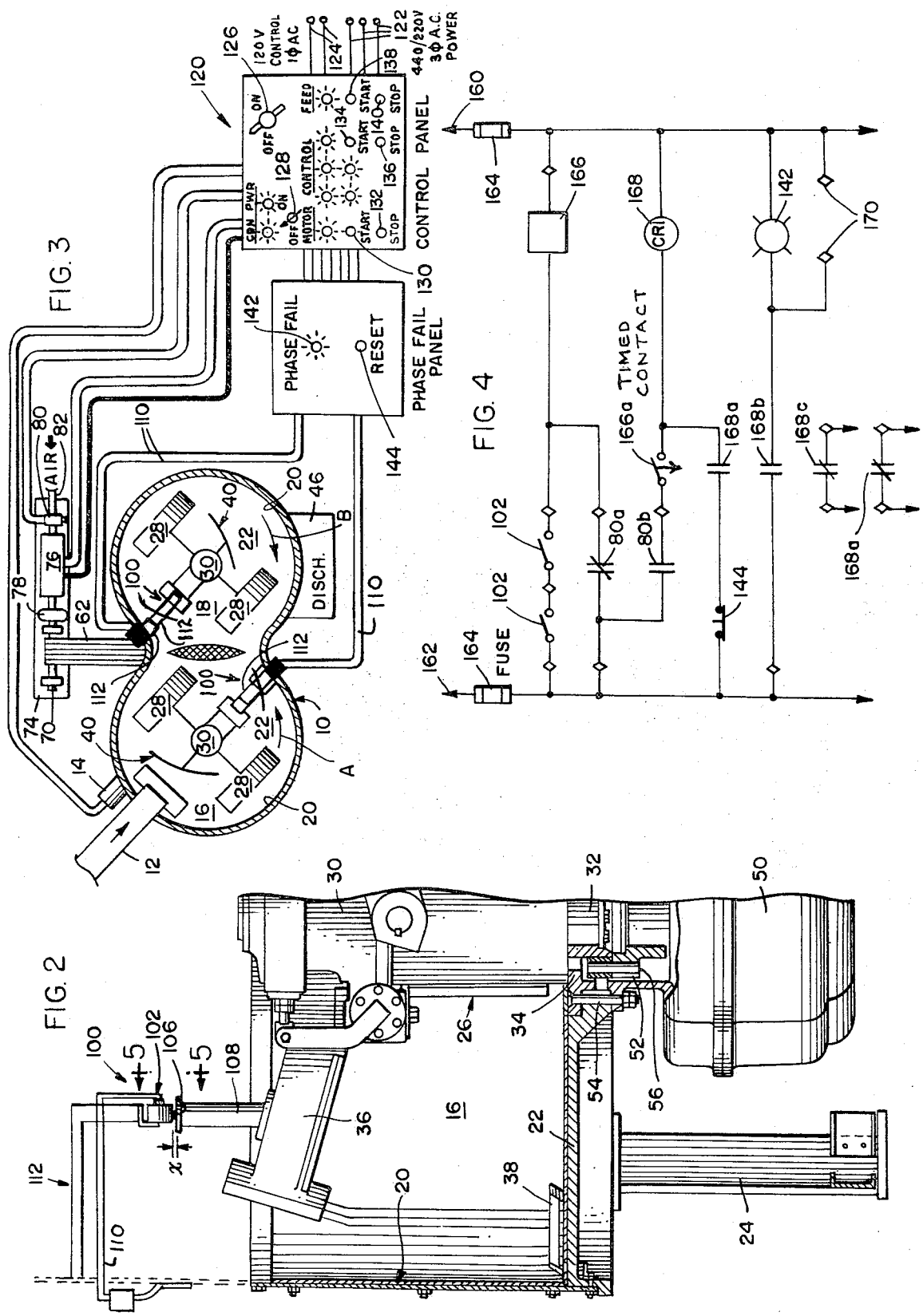

MULTI-MULL PHASE CONTROL SYSTEM

The present invention relates to a new and improved multiple stage mixing apparatus and is an improvement and refinement of the apparatus shown, described and claimed in U.S. Pat. No. RE 25,475 dated Nov. 5, 1963. In multiple stage mixing apparatus of the type shown in the foregoing patent there are employed a pair of rotary mixing elements, which elements, pass over a common area at the junction of the respective mixing chambers. Each mixing element is driven to rotate in a selected phase relationship with respect to the other element in order to effect a flow or transfer of material from the inlet or charging chamber to the outlet or discharging chamber in a continuous mixing process. If one of the rotary mixing elements for any reason fails to rotate when power is being supplied, or for any reason the selected phase relation between the two mixing elements becomes abnormal there is a chance of direct collision and engagement between the mixing elements in the common area at the junction of the respective chamber. For example, should a foreign object become lodged in one of the mixing chambers and because of excessive torque cause a shear pin in the drive train of the mixing element to fail, the mixing element would stop rotating while the mixing element in the other chamber would continue to rotate at normal speed. If the disabled mixing element happens to stop with its outer plow in the common area at the junction of the mixing chambers, the outer plow of the operative mixing element would then collide directly with the stopped element. After maintenance on the power train of the mixer, the phase relation between the pair of mixing elements may not be properly reestablished and operating the mixer in this condition can cause extensive damage to the mixing elements if a collision between the plows occurs.

The present invention provides a new and improved multiple stage mixing apparatus of the general type described wherein means is provided for sensing the phase relation between the mixing elements rotating in the separate mixing chambers and for shutting down the source of rotative power when an improper phase relation condition is sensed.

The foregoing is a primary object and advantage of the present invention and another object is to provide a control system for monitoring the phase relation between the mixing elements in a multiple element mixing apparatus of the character described.

Still another object of the present invention is to provide a new and improved multiple stage, continuous mixer having means for automatically disconnecting the rotative power source for the mixing elements whenever the mixing elements are out of the selected phase relation relative to one another.

Another object of the present invention is to provide a new and improved continuous mixing system wherein the equipment used to feed material into a continuous mixer is automatically stopped upon sensing a condition of improper phase relation between the rotary mixing elements of the mixer.

Yet another object of the present invention is to provide a new and improved mixer control system adapted to shut down the mixer in the event of a sheared drive pin on one of the mixing elements, or in the event of an out of phase relation between the separate mixing elements.

The foregoing and other objects and advantages of the present invention are accomplished in an illustrated embodiment comprising a new and improved multiple stage mixing apparatus having a pair of mixing chambers in communication with each other for the transfer of materials therebetween and a rotary mixing element mounted in each chamber movable on a path overlapping into the other chamber and in selected normal phase relation with respect to the mixing element therein. The mixer includes a source of motive power for rotatingly driving the mixing elements and control means is provided for rendering said motive power source ineffective any time the elements are sensed to be out of said normal phase relation with respect to one another.

For a better understanding of the present invention reference should be had to the following detailed description when taken in conjunction with the drawings in which:

FIG. 1 is a top plan view of a multiple stage mixer constructed in accordance with the present invention;

FIG. 2 is a fragmentary, vertical sectional view taken substantially along lines 2—2 of FIG. 1; the FIG. 3 is a schematic diagram illustrating the new and improved continuous mixing system in accordance with te present invention;

FIG. 4 is a fragmentary portion of an electrical schematic diagram for the mixer control circuit of the present invnetion; and FIG. 5 is an enlarged, fragmentary elevational view looking in the direction of arrows 5—5 of FIG. 2.

Referring now more particularly to the drawings, therein is illustrated a new and improved multiple stage, continuous mixing apparatus, referred to generally by the reference numeral 10, and constructed in accordance with the features of the present invention. The apparatus 10 is generally similar to the apparatus shown in the aforementioned patent, which patent is owned by the same assignee as the present invention. The mixer 10 is adapted to mix and mull various types of bulk particulate materials including, for example, foundry sand on a continuous rather than a batch basis. The mixer is adapted to be fed from a feed belt conveyor 12 or other suitable conveyance for supplying material to the mixer at the desired flow rate and the belt conveyor is driven by an electric gear motor 14 or other suitable motive power source. The mixer 10 includes a pair of generally cylindrical mixing chambers 16 and 18 which may be appropriately designated as the inlet or charging chamber and the outlet or discharging chamber. The chambers are in direct communication with one another in order to accommodate the transfer of materials therebetween with a net flow from the charge chamber 16 to the outlet chamber 18. As best shown in FIGS. 1 and 2, each mixing chamber includes an upstanding vertical side wall portion 20 supported on a circular bed or base plate 22 and in plan view the bed plates of the respective chambers intersect one another at chordal segments to form a generally FIG. 8 shaped silhouette when viewed from the top as in FIGS. 1 and 3. The bed plate structure of the chambers is supported from the floor or other supporting structure by a plurality of vertical support legs 24.

In each mixing chamber 16 and 18 there is provided a mixing head assembly generally indicated by the reference numeral 26 and rotatable about an upstanding vertical center axis at the center of each circular bed plate 22. As described in the aforementioned patent, each mixing head assembly 26 includes a pair of large, heavy, floating mulling wheels 28 mounted on support axle structures extending from opposite sides of the central axis of rotation of the mixing head. These mulling wheels are mounted for free rotation on suitable support axles and the outer periphery of the wheels directly engage the material in the mixing chamber for kneading and mulling the material as the mixing head rotates to break up lumps therein. Each mixing head assembly 26 includes a turret head 30 mounted at the upper end of a vertical drive shaft 32, which shaft is supported at its lower end by an annular bearing assembly 34 carried at the center of the circular bed plate 22 of its mixing chamber. The mixing heads include an outwardly extending arm 36 for supporting an outer plow assembly 38 adapted to move in a circular path around the outer periphery of the mixing chamber as the mixing heads rotate. As indicated in FIGS. 1 and 3 the mixing head assembly in the charging and discharging mixing chambers 16 and 18 are driven to rotate in opposite directions as indicated by the arrows "A" and "B" and the outer plow assemblies 38 traverse or pass over a common area of elliptical shape (indicated by cross hatching and the letter "C") adjacent the junction between the cylindrical mixing chambers. Each mixing head 26 also includes an inner plow assembly 40 supported on the turret head 30 on a side opposite the outer plow assembly 38. The inner plows are adapted to move material outwardly from the central portion of the mixing chambers into the path traversed by the mulling wheel 28.

As best indicated in FIGS. 1 and 3 material is delivered into the charging chamber 16 of the mixer 10 from a feed conveyor 12 and is then moved around the chamber in a generally counterclockwise direction (as indicated by the arrows "A") while being mixed and mulled by the plow assemblies and the mulling wheels 28. Material from the inlet chamber is picked up in the common area between chambers (designated "C") by the outer plow assembly 38 of the mixing head 26 in the outlet or discharge chamber 18. The mixing head in the discharge chamber 18 rotates in an opposite or clockwise direction (as indicated by the arrows "B"). The outer plow assemblies 38 of both mixing heads are adapted to mix and move the material around the outer periphery of the mixing chambers and deflect the material inwardly toward the center into the path of the mulling wheels 28 and the inner plow assemblies 40 are adapted to mix and move the material around the central portion of the chambers outwardly into the path of the mulling wheels.

In accordance with the invention the mixing heads 26 in the respective inlet and outlet mixing chambers 16 and 18 are driven in selected phase relation with respect to one another to provide a net flow of material from the inlet to the outlet chambers and to prevent the outer plow assemblies 38 from colliding or engaging one another in the common area "C." In addition, the normal phase relation between the respective rotative mixing heads 26 in the chambers 16 and 18 is selected so that transfer of material back and forth between the chambers occurs more or less continuously. A net transfer of material from the inlet chamber 16 to the outlet chamber 18 is obtained because the outer plow assemblies 38 of the respective mixing heads although driven to rotate at the same speed are not 180° out of phase. In other words the outer plows 38 of the respective mixing heads do not follow one another across the common area "C" by equal time intervals during each revolution. Material received in the chamber 16 is eventually transferred to the chamber 18 by the rotary mixing heads 26 and is then discharged from the outlet chamber 18 through a discharge opening in the wall 20 which is controlled by a movable discharge door 42. The door is mounted on a shaft 44 supported from opposite sides of a discharge chute 46 and the opening and closing of the door is controlled by an air cylinder 48. The material discharge control system of the mixer 10 is preferably of the type shown and described in U.S. Pat. No. 3,395,834 which patent is incorporated herein by reference.

Each of the mixing heads 26 includes a drive shaft 32 coupled to the output shaft of a reduction gear box assembly 50 secured to the underside of the bed plate structure 22 at the center of the mixing chamber. The output shaft of the reduction gear boxes are directly coupled to their respective drive shafts by means of cooperating annular flange coupling members 52 and 54 which are carried on the ends of the respective shafts. These flange couplings are drivingly connected by one or more shear pins 56 which are of a selected strength and adapted to shear upon prescribed maximum levels of drive torque between the reducer and mixing head. The shear pins 56 provide a safety system for decoupling the output shaft of the gear box from the mixing heads when over torquing occurs. If for example, an excessive volume of material is fed to rapidly discharge into the inlet mixing chamber 16 causing excessive torque and force on the mixing head 26 to develop, the shear pin 56 will fail and thereby decouple the mixing head from the output shaft of the gear box to prevent damage to the system and further overloading of the drive motor. Each reduction gear box assembly 50 is supplied with rotative power from a common, interconnecting drive shaft 58 (FIG. 1). Opposite ends of the shaft are connected to the input shafts on the respective gear boxes 50 through couplings 60. The couplings 60 may be of the shear type designed with a shear pin to fail and provide decoupling when a maximum torque level is reached. The shaft 58 is driven via a belt or chain drive system 62 which includes a plurality of endless chains or belts 64 entrained around a drive pulley 66 and a driven pulley 68 mounted on the shaft 58. The drive pulley 66 is mounted on a motor extension shaft 70 supported in a pair of bearings 72 mounted on a power unit base 74. The shaft 70 is coupled to a source of rotative power output such as the rotor shaft of an electric motor 76 having suitable horsepower, speed and torque characteristics. Coupling is achieved by means of an electrically actuated clutch 78 operated by compressed air and controlled by a solenoid type clutch control air valve 80. The clutch air valve 80 is adapted to selectively supply or exhaust compressed air at suitable operating pressure into or out of the clutch via a passage in the motor shaft. When the solenoid is energized, compressed air is supplied via the clutch valve 80 to engage the clutch and the air is supplied via an inlet conduit 82 connected to a suitable source of compressed air. When the solenoid of the clutch air valve 80 is deenergized, the clutch is disengaged by venting the fluid to the atmosphere and the electric motor 76 is decoupled from the output shaft 70 so that rotative power is no longer provided for the mixing heads 26.

From the foregoing, it will be seen that the source of rotative power such as the motor 76 may be decoupled from the mixing heads in a number of different ways including the de-energization of the motor itself, de-energizing the clutch control valve 80, shearing of the pins 56 of the individual mixing head drive shafts and shearing or failure of other components in the power train from the motor to the mixing heads.

In accordance with a feature of the present invention, a pair of sensing devices 100 (FIG. 5) are provided for monitoring the selected phase relationship between the mixing head assemblies 26 and for detecting any change from the desired phase relationship between the heads. Each sensing device 100 includes a proximity switch 100 which is activated once during each revolution of its respective mixing head assembly 26 and in the illustrated embodiment, the proximity switches 102 comprise magnetic reed switches having a pair of relatively movable, magnetic reed contacts 104 which open and close to make and break contact. The switches close when a magnetic means such as a permanent magnet disc 106 is passed directly below the reed contacts 104 and the switches open when the disc moves away. The magnetic discs 106 are mounted on upright support ports 108 carried on the respective mixing heads 26 and each sensing device 100 further includes one or more electrical leads 110 for connecting the reed switches 102 with a suitable electrical control circuit. The magnetic discs 106 and support posts 108 are positioned similarly on each of the rotatable mixing head assemblies 26, for example, on the lateral arms 36 supporting the outer plows 38. The proximity switches 102 are thus actuated as the arms pass thereby once during each revolution of the mixing head assemblies 26. The proximity switches 102 are fixedly mounted on support structures 112 and are adjusted such that a very small clearance "x" is provided upon the passage of the magnetic disc 106 below the proximity switches 102.

In accordance with a feature of the invention, one sensing device 100 is provided for each of the chambers 16 and 18 which contain a rotating mixing head 26 and the devices are positioned so that both proximity switches 102 are activated or closed at exactly the same moment in time by the respective magnetic discs 106. An optimum position for mounting the sensing devices 100 to support their proximity switches 102 for simultaneous actuation is illustrated in FIGS. 1 and 3 although the relative positioning of the sensing devices 100 may be changed to other points on the perimeters of the mixing chambers. The position chosen for fixedly mounting the sensing device 100 for the chamber 16 must be coordinated with the position chosen for fixedly mounting the other sensing device 100 for the chamber 18 so that two proximity switches 102 will be activated at the same moment in time.

In accordance with a feature of the present invention, a control panel 120 (FIG. 3) is provided to enable the mixing apparatus 10 to be automatically or manually controlled. The mixer and control panel 120 is supplied with power by input leads 122 carrying high voltage, three-phase, alternating current for operating the drive motor 76 and the motor 14 for the feed conveyor 12. Input leads 124 supply relatively low voltage, single-phase, alternating current power for operating the starter for the mixer motor and the feed belt conveyor drive motor 14 and the solenoid controlled, clutch air valve 80.

A main circuit disconnect 126 is provided for removing all control power to the mixing apparatus 10. The mixing apparatus 10 is energized by placing a control power switch 128 in the "on" position and subsequently, the drive motor 76 my be energized by pressing a "start" button 130. The drive motor may be stopped at any time by pressing a "stop" button 132.

After the drive motor 76 has been started, the mixing head assemblies 26 may be actuated to begin their rotation by energizing the solenoid controlled, clutch air valve 80. The solenoid air valve 80 may be energized manually by depressing a "start" button 134 or de-energized at any time by depressing a "stop" button 136. When the solenoid air valve 80 is energized, compressed air is supplied to the clutch 78 to drivingly interconnect the motor extension shaft 70 and the output shaft of the motor 76. When the solenoid air valve 80 is de-energized, the compressed air from the clutch is vented to the atmosphere to thereby disengage the clutch 78. When the motor extension shaft 70 is rotated both mixing head assemblies 26 begin to rotate as previously described. After the mixing head assemblies 26 are rotating, the feed belt conveyor drive motor 14 is energized by depressing a "start" button 138 to feed material into the mixer. The feed belt conveyor drive motor 14 may be de-energized at any time by depressing a "stop" button 140 to stop the flow of material to the mixer.

A series of relay interlocks are provided so that the feed belt conveyor drive motor 14, which drives the feed belt conveyor 12, may not be energized until the mixing head assemblies 26 are rotating and other relay interlocks are provided to insure that the clutch is not engaged unless the drive motor 76 is running.

A phase failure light 142 is provided on the control panel 120 (FIGS. 3 and 4) to indicate visually an alarm whenever the mixing head assemblies 26 are sensed to be out of the proper phase relationship and when this occurs, the mixer 10 is automatically shut down and further operation is prevented until a "reset" button 144 is depressed. A control circuit 160 incorporating a pair of sensing devices 100 for the chambers 16 and 18 for use in monitoring the selected phase relation of the two mixing head assemblies 26 is illustrated in FIG. 4. The low voltage, single-phase, alternating current power from the input lines 124 (FIG. 3) is supplied to a pair of terminals 162 (FIG. 4) with fuses 164 provided for interrupting the power flow if an overload condition occurs.

The control circuit 160 includes a time delay relay 166 having an adjustable preset time delay characteristic or capability which is set up to provide a timed interval slightly greater than the time required for a mixing head assembly 26 to complete one full revolution when it is operating on speed. When the time delay relay 166 is de-energized, it begins a time out interval and at the end or timing out of the period, a relay contact 166a controlled thereby is closed. The timing period of the time delay relay 166 can be interrupted and the relay is reset when alternating current power is again resupplied to the relay 166 before the completion of the original timing period. Initially, alternating current power is supplied to the timing relay 166 (FIG. 4) through a normally-closed, clutch control, relay switch 80a operatively associated with the solenoid air valve 80 for controlling the mixer clutch 78. When the "start" button 134 is depressed to engage the clutch 78, the relay switch 80a is opened to activate the phase sensor system and a normally-open clutch control relay switch 80b is closed to ready the FAILURE ALARM and STOP CIRCUITS. When this occurs, the time delay relay 166 is de-energized and begins its timing period (which period is adjustably preset for an interval slightly greater than the time required for the mixing head assemblies 26 to complete one full revolution when on-speed). In normal operation, with on-speed and proper phase relation between the heads 26, the time-out period of the relay 166 is interrupted by the simultaneous activation and closure of the proximity switches 102 which action momentarily energizes or resets the relay and starts a new timing period before the prior timing period had expired.

Various occurrences may result in the time-out peperiod of the relay 166 failing to be RE-ACTIVATED or reset before completion. For example, one or more of the belts or chains 64 of the belt drive assembly 62 may be slipping and cause the mixing head assemblies 26 to rotate at a slower speed than normal and this condition may permit the relay 166 to fully time-out. On start up of the mixer, the time required after initial engagement of the clutch 78 until normal on-speed operation of the mixing heads is achieved may be too long indicating belt or clutch slippage and this will permit the relay to time-out. One of the shear pins 56 or a shear pin associated with one of the couplings 60 may have sheared because of excessive torque due to an obstruction resulting in the stoppage or slowage of rotation of one of the mixing head assemblies 26 while the other continues at normal speed. When this occurs, only one of the sensor switches 102 is activated at one time because of the out of phase relation and the time delay relay is permitted to time out. The two mixing head assemblies 26 may have been initially set up with an improper phase relationship or after maintenance the drive trains may not have been reconnected with the proper phase relationship between the mixing heads and the proximity switches 102 may have been improperly positioned. If one of the above occurrences takes place, both of the proximity switches 102 (FIG. 4) will fail to close simultaneously, thereby permitting the time-out period of the relay 166 to expire.

At the expiration of a complete time-out period of the relay 166, the TIMED CONTACT 166a closes and energizes a failure relay 168. Energizing of the failure relay 168 closes two pairs of normally-open relay switches 168a and 168b and opens one or more pairs of normally-closed switches 168c, 168d, 168e etc. The "reset" button 144 is normally closed, and the failure relay 168 is then held energized through the now closed switch 168a. Closure of the switch 168b illuminates the phase failure light 142 and if desired, an external, audible, visual or other type of alarm may be connected between a pair of terminals 170 to indicate a phase failure.

The relay switch 168c is wired in series in the lines supplying power to the solenoid controlled, clutch operating air valve 80 and the switch 168d is in series in the power lines to the starter of the feed belt conveyor drive motor 14. Opening of the switches 168c and 168d, causes the de-energization of the clutch control valve 80 and deactivates the feed belt conveyor drive motor 14 stopping the mixer and the flow of material supplied thereto. The failure relay 168 is maintained in an energized condition via the "reset" button 144 and the closed holding relay contacts 168a, and it is not possible to re-energize the clutch control solenoid air valve 80 or the feed belt conveyor drive motor 14 until the "reset" button 144 is depressed. Thus a positive physical action by an operator is required before the mixing apparatus 10 may be placed in an operative mixing head condition after a phase failure has occurred.

Many modifications and variations of the present invention are possible in light of the above teachings. It is therefore to be understood that, within the scope of the appended claims, the present invention may be practiced otherwise than as specifically described.

What is claimed as new and desired to be secured by Letters Patent of the United States is:

1. In a multiple stage mixer, a pair of mixing chambers in communication with each other for the transfer of material therebetween, a rotary mixing element in each chamber movable on a path overlapping into the other chamber and in selected normal phase relation with the mixing element therein, a source of motive power for rotatively driving said mixing elements, and control means for rendering said motive power source ineffective to rotatively drive said mixing elements when said elements are out of said normal phase relation with each other.

2. The mixer of claim 1 wherein said control means includes a pair of sensing devices activated by the relative position of said mixing elements in their respective mixing chambers.

3. The mixer of claim 2 wherein said motive power source includes motor means, a drive shaft drivingly connected with said mixing elements, and clutch means for selectively coupling and decoupling said motor means and said shaft, and means controlled by said sensing devices for decoupling said clutch means when said elements are sensed to be out of said normal phase relation.

4. The mixer of claim 3 wherein said sensing devices comprise a pair of switches interconnected in series and positioned on said mixing chambers for simultaneous activation by the rotation of said rotary mixing elements in proper phase relation with respect to each other.

5. The mixer of claim 4 wherein said control means includes a timer activated to begin an adjustable timing cycle by the simultaneous activation of said sensing switches.

6. The mixer of claim 5 wherein said control means includes circuit means for controling said clutch means to decouple said motor means and said shaft when simultaneous activation of said sensing switches does not occur within a selected time interval set up on said timer.

7. The mixer of claim 6 wherein said control means includes alarm signal means for alerting an operator whenever said sensing switches are not activated simultaneously during each revolution of said mixing elements.

8. In combination, a multiple stage mixer including a pair of mixing chambers in communication with each other for the transfer of material therebetween, a material feeder for delivery of material to at least one of said chambers for mixing therein, a rotary mixing element in each chamber movable on a path overlapping into the other chamber and in selected normal phase relation with the mixing element therein, a source of motive power for rotatively driving said mixing elements, and control means for rendering said motive power source ineffective to rotatively drive said mixing elements when said elements are out of said normal phase relation with each other, said control means including means for preventing said feeder from feeding material into said chamber when said mixing elements are out of phase.

9. The combination of claim 8 wherein said control means includes a clutch for interconnecting said source of motive power and said mixing elements, a pair of sensor switches mounted for simultaneous activation by the in-phase rotation of said mixing elements in said mixing chambers, a timer activated by said simultaneous activation of said sensor switch to begin an adjustable timing cycle and means activated by the completion of a timing cycle for operating said clutch to disconnect said source of motive power from said mixing elements.

10. The combination of claim 9 wherein said control means includes circuit means for recycling said timer to begin another timing cycle prior to the time out completion of the previous cycle when said sensor switches are activated simultaneously by on-speed rotation of said mixing elements.

* * * * *